US012112864B2

(12) United States Patent
Yamasaki et al.

(10) Patent No.: US 12,112,864 B2
(45) Date of Patent: Oct. 8, 2024

(54) ELECTRICAL INSULATION COMPOSITION AND POWER CABLE

(71) Applicant: SUMITOMO ELECTRIC INDUSTRIES, LTD., Osaka (JP)

(72) Inventors: Satoshi Yamasaki, Osaka (JP); Takanori Yamazaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 361 days.

(21) Appl. No.: 17/428,135

(22) PCT Filed: Jan. 10, 2020

(86) PCT No.: PCT/JP2020/000707
§ 371 (c)(1),
(2) Date: Aug. 3, 2021

(87) PCT Pub. No.: WO2020/202689
PCT Pub. Date: Oct. 8, 2020

(65) Prior Publication Data

US 2022/0130571 A1 Apr. 28, 2022

(30) Foreign Application Priority Data

Apr. 4, 2019 (JP) ................................ 2019-071786

(51) Int. Cl.

| | |
|---|---|
| ***H01B 3/44*** | (2006.01) |
| ***C08K 5/14*** | (2006.01) |
| ***C08K 5/20*** | (2006.01) |
| ***C08L 25/06*** | (2006.01) |
| ***H01B 9/02*** | (2006.01) |

(52) U.S. Cl.
CPC ................ *H01B 3/44* (2013.01); *C08K 5/14* (2013.01); *C08K 5/20* (2013.01); *C08L 25/06* (2013.01); *H01B 9/027* (2013.01)

(58) Field of Classification Search
CPC . H01B 3/44; H01B 9/027; C08K 5/14; C08K 5/20; C08L 25/06; C08L 23/06
See application file for complete search history.

(56) References Cited

U.S. PATENT DOCUMENTS 6,274,239 B1 * 8/2001 Peruzzotti ............. H01B 3/441 428/375
2008/0269388 A1 10/2008 Markovich et al.
(Continued)

FOREIGN PATENT DOCUMENTS

CN 101117418 A 2/2008
CN 101367972 A 2/2009
(Continued)

OTHER PUBLICATIONS

English Translation JPH11236470, Tosoh Corp. Published Aug. 31, 1999 (Year: 1999).*
(Continued)

*Primary Examiner* — Steven T Sawyer
(74) *Attorney, Agent, or Firm* — Oliff PLC

(57) ABSTRACT

An electrical insulation composition includes a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

22 Claims, 1 Drawing Sheet

160
150
140
130
120
110
10

(56) References Cited

U.S. PATENT DOCUMENTS

| | | | | |
|---|---|---|---|---|
| 2013/0069013 | A1 | 3/2013 | Esseghir | |
| 2014/0133133 | A1* | 5/2014 | Tyan | G02B 6/0053 362/339 |
| 2015/0267036 | A1 | 9/2015 | Cree | |
| 2016/0211050 | A1* | 7/2016 | Matsumura | C08K 5/14 |
| 2017/0233546 | A1* | 8/2017 | Cree | C08K 5/01 524/585 |
| 2018/0030175 | A1* | 2/2018 | Miura | C08F 8/00 |
| 2018/0244896 | A1* | 8/2018 | Ichino | F16L 11/04 |

FOREIGN PATENT DOCUMENTS

| | | | |
|---|---|---|---|
| CN | 104823246 | A | 8/2015 |
| JP | S57-069611 | A | 4/1982 |
| JP | H06-267334 | A | 9/1994 |
| JP | H11-236470 | A | 8/1999 |
| JP | 2002-265747 | A | 9/2002 |
| JP | 2008-031353 | A | 2/2008 |
| JP | 2008-545017 | A | 12/2008 |
| JP | 2013-528690 | A | 7/2013 |
| JP | 2015-535864 | A | 12/2015 |
| WO | 2014/051954 | A1 | 4/2014 |

OTHER PUBLICATIONS

English Translation JP2008031353, Hitachi Cable Ltd, Published Feb. 14, 2008 (Year: 2008).*

Mar. 31, 2020 Search Report issued in International Patent Application No. PCT/JP2020/000707.

* cited by examiner

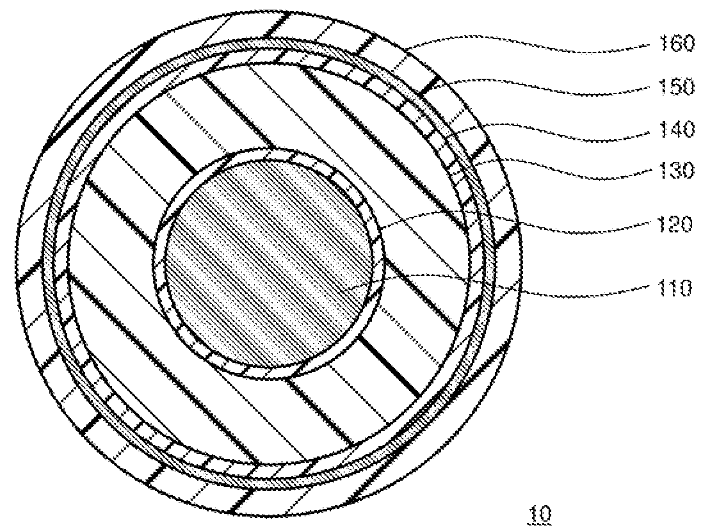
160
150
140
130
120
110
10

ELECTRICAL INSULATION COMPOSITION AND POWER CABLE

TECHNICAL FIELD

The present disclosure relates to an electrical insulation composition and a power cable.

The present application claims priority based on Japanese Unexamined Patent Publication No. 2019-071786 filed on Apr. 4, 2019, which is incorporated herein by reference in its entirety.

BACKGROUND

Polyethylene is widely used as a base resin for an electrical insulation composition that is included in an insulation layer of a power cable because of its excellent insulation (e.g., Patent Document 1).

PRIOR ART DOCUMENT

Patent Document

Patent Document 1: Japanese Unexamined Patent Publication No. S57-69611

SUMMARY OF THE INVENTION

According to an aspect of the present disclosure, there is provided an electrical insulation composition, including:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

According to another aspect of the present disclosure, there is provided a power cable including:

a conductor, and an insulation layer provided to cover an outer periphery of the conductor;

the insulation layer including an electrical insulation composition including:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

BRIEF DESCRIPTION OF THE DRAWINGS

FIG. 1 is a schematic sectional view orthogonal to an axial direction of a power cable according to an embodiment of the present disclosure.

DESCRIPTION OF THE EMBODIMENTS

Problem to be Solved by the Disclosure

When a power cable is charged in a wet environment or a water-immersed environment, water trees may be generated in an insulation layer. Therefore, it is required to improve a water tree resistance of the insulation layer.

An object of the present disclosure is to provide a technique that can improve water tree resistance while ensuring various cable characteristics.

Advantageous Effect of the Disclosure

According to the present disclosure, the water tree resistance can be improved while ensuring various cable characteristics.

DESCRIPTION OF THE EMBODIMENT OF THE DISCLOSURE

<Knowledges Obtained by the Inventors>

First, an outline of the knowledges obtained by the inventors will be described.

A power cables may be laid, for example, in a wet environment or a water-immersed environment in some cases. In such an environment, when a predetermined electric field is applied to an insulation layer of the power cable, a water tree may be generated in the insulation layer. When the water tree is generated in the insulation layer, the insulation of the power cable may be deteriorated.

The water tree is generated, for example, by the following mechanism. In a wet environment or a water-immersed environment, water can infiltrate into the insulation layer of the power cable. When water infiltrates into the insulation layer during charging of the power cable, the water aggregates in a part where a local electric field concentration is generated in the insulation layer. Examples of the local electric field concentration part include voids in the insulation layer, foreign substances, and a mismatching part at an interface between the insulation layer and the semiconductive layer. When the water aggregates in such a local electric field concentration part, mechanical strain occurs around such a water aggregation part due to an increased pressure of the aggregated water. As a result, a tree-like or bow-tie-like water tree is generated in the insulation layer.

In the past, in order to suppress the generation of the water tree in the insulation layer of the power cable, various techniques have been studied, for example, as in Patent Document 1 mentioned above.

Recently, however, the specifications required for the power cable laid in a wet environment or a water-immersed environment have become stricter. Alternatively, there is a need to simplify the configuration of the power cable laid in a wet environment or in a water-immersed environment to reduce the cost of the power cable. For these reasons, there is a need for a power cable with further improved water tree resistance than before.

Therefore, the present inventors have studied the materials added in the electrical insulation composition included in the insulation layer of the power cable. Specifically, the inventors considered styrene-containing resins and fatty acid amides among the various materials added in the electrical insulation composition. As a result of the consideration, it was found that the number density of the water trees generated in the insulation layer can be reduced by adding either the styrene-containing resin or the fatty acid amide.

As a result of further intensive study, the present inventors have found that the addition of both the styrene-containing resin and the fatty acid amide can remarkably improve the water tree resistance. Specifically, the present inventors have found that the maximum length of the water tree generated in the insulation layer can be shortened, and the number density of the water trees generated in the insulation layer can be remarkably reduced.

The present disclosure is based on the above-mentioned knowledges found by the inventors.

<Embodiments of the Disclosure>

Next, embodiments of the present disclosure will be listed and described.

[1] An electrical insulation composition according to an aspect of the present disclosure includes:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

According to this configuration, the water tree resistance can be remarkably improved while ensuring various cable characteristics.

[2] In the electrical insulation composition according to [1], a maximum length of a water tree generated in the electrical insulation composition is less than 200 μm when an AC electric field of 4 kV/mm at a commercial frequency is applied to the electrical insulation composition for 1,000 hours, with the electrical insulation composition including the base resin and the fatty acid amide being immersed in 1 N NaCl aqueous solution at an ordinary temperature.

According to this configuration, the dielectric breakdown of the insulation layer caused by the water tree can be stably suppressed.

[3] In the electrical insulation composition according to [1] or [2], a number density of water trees having a length of 30 μm or more generated in the electrical insulation composition is less than 200 $cm^{-3}$ when an AC electric field of 4 kV/mm at a commercial frequency is applied to the electrical insulation composition for 1,000 hours, with the electrical insulation composition including the base resin and the fatty acid amide being immersed in 1 N NaCl aqueous solution at an ordinary temperature.

According to this configuration, the dielectric breakdown of the insulation layer caused by the water tree can be stably suppressed.

[4] In the electrical insulation composition according to any one of [1] to [3], a content percentage of styrene in the styrene-containing resin is less than 45% by mass.

According to this configuration, the maximum length of the water tree can be sufficiently shortened. In addition, a dissipation factor can be sufficiently reduced. Moreover, mechanical characteristics (tensile strength and tensile elongation) can be sufficiently improved.

[5] In the electrical insulation composition according to any one of [1] to [4], a total content of the styrene in the base resin is 0.15 parts by mass or more and 11 parts by mass or less with respect to 100 parts by mass of the base resin.

According to this configuration, since the total styrene content is 0.15 parts by mass or more, the water tree suppression effect by the styrene-containing resin can be sufficiently obtained. Since the total styrene content is 11 parts by mass or less, the dissipation factor can be sufficiently reduced, and mechanical characteristics (tensile strength and tensile elongation) can be sufficiently improved.

[6] In the electrical insulation composition according to any one of [1] to [5], a ratio of the total content of the styrene in the base resin to a content of the fatty acid amide is 1.5 or more and 110 or less.

According to this configuration, a remarkableness of the water tree suppression effect by both the fatty acid amide and the styrene-containing resin can be sufficiently obtained. Moreover, increase in the dissipation factor and deterioration in the mechanical characteristics (decrease in tensile strength and decrease in tensile elongation) can be stably suppressed.

[7] The electrical insulation composition according to any one of [1] to [6], further including 0.1 parts by mass or more and 10 parts by mass or less of an unsaturated dimer of α-aromatic substituted α-methylalkene.

According to this configuration, in addition to the water tree suppression effect by both the styrene-containing resin and the fatty acid amide, the generation of water tree in the insulation layer can be more stably suppressed.

[8] In the electrical insulation composition according to any one of [1] to [7], the fatty acid amide includes a fatty acid monoamide.

According to this configuration, the suppression effect on the local concentration of water by a polar group can be improved.

[9] In the electrical insulation composition according to any one of [1] to [8], the fatty acid amide includes an unsaturated fatty acid amide.

According to this configuration, electrons can be trapped by the dispersed unsaturated bond moieties (double bonds), and the local electric field concentration can be suppressed.

[10] The electrical insulation composition according to any one of [1] to [9], further including a crosslinking agent containing an organic peroxide.

According to this configuration, the crosslinking agent can crosslink the base resin. Thereby, the mechanical and electrical characteristics of the electrical insulation composition can be improved.

[11] In the electrical insulation composition according to any one of [1] to [9], the base resin is crosslinked.

According to this configuration, the mechanical and electrical characteristics of the electrical insulation composition can be improved.

[12] A power cable according to another aspect of the present disclosure includes a conductor, and an insulation layer provided to cover an outer periphery of the conductor;

the insulation layer including an electrical insulation composition including:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

According to this configuration, the water tree resistance can be remarkably improved while ensuring various cable characteristics.

Details of Embodiment of the Disclosure

Next, an embodiment of the present disclosure will be described below with reference to the drawings. The present disclosure is not limited to these illustrations, but intended to be indicated by claims and encompass all the changes which fall within the meaning and scope equivalent to claims.

One Embodiment of the Disclosure (1) Electrical Insulation Composition

An electrical insulation composition of this embodiment is a material included in an insulation layer 130 of a power cable 10 described later, and includes, for example, a base resin, a fatty acid amide, and other additives.

The "electrical insulation composition" in this embodiment encompasses, for example, a composition in an uncrosslinked state that does not contain a crosslinking agent described later, a composition in an uncrosslinked state that contains a crosslinking agent described later, and a composition in a crosslinked state.

(Base Resin)

A base resin (base polymer) means a resin component included in a main component of the electrical insulation composition. The base resin of this embodiment contains, for example, a polyethylene and a styrene-containing resin.

Examples of the polyethylene included in the base resin include a low density polyethylene (LDPE: density 0.91 $g/cm^3$ or more and less than 0.93 $g/cm^3$), a linear low density polyethylene (LLDPE: density 0.945 $g/cm^3$ or less), a medium density polyethylene (MDPE: density 0.93 $g/cm^3$ or more and less than 0.942 $g/cm^3$), a high density polyethylene (HDPE: density 0.942 $g/cm^3$ or more), and the like. Among them, at least one of LDPE and LLDPE is preferred. Thereby, the mechanical characteristics can be improved while improving the insulation of the power cable.

The term "styrene-containing resin" included in the base resin means a polymer at least a part of which contains styrene, and can be rephrased as a styrene-based thermoplastic elastomer.

When the base resin includes the styrene-containing resin, electrons can be trapped by an aromatic ring of the styrene to form a stable resonance structure. In addition, the styrene-containing resin can be made to act as an elastomer to suppress the occurrence of a mechanical stress crack. As a result, the generation of the water tree in the insulation layer 130 described later can be suppressed.

Specifically, examples of the styrene-containing resin include a styrene-butadiene-styrene block copolymer, a hydrogenated styrene-butadiene-styrene block copolymer, a styrene-isoprene-styrene copolymer, a hydrogenated styrene-isoprene-styrene copolymer, a hydrogenated styrene-butadiene rubber, a hydrogenated styrene-isoprene rubber, a styrene-ethylene-butylene-olefin crystal block copolymer, and the like. It should be noted that two or more of them may be used in combination.

The term "hydrogenated" used herein means that hydrogen is added to a double bond. For example, "hydrogenated styrene-butadiene-styrene block copolymer" means a polymer obtained by adding hydrogen to a double bond of a styrene-butadiene-styrene block copolymer. Note that hydrogen is not added to a double bond in the aromatic ring of the styrene. The term "hydrogenated styrene-butadiene-styrene block copolymer" can be rephrased as "styrene-ethylene-butylene-styrene block copolymer".

When the total content of the base resin is regarded as 100 parts by mass, the content of the polyethylene in the base resin is, for example, 65 parts by mass or more and 98 parts by mass or less, and the content of the styrene-containing resin in the base resin is, for example, 2 parts by mass or more and 35 parts by mass or less.

When the content of the styrene-containing resin is less than 2 parts by mass, the water tree suppression effect by the styrene-containing resin may not be sufficiently obtained. In contrast, when the content of the styrene-containing resin is 2 parts by mass or more, the water tree suppression effect by the styrene-containing resin can be sufficiently obtained. On the other hand, when the content of the styrene-containing resin is more than 35 parts by mass, electrons may be excessively trapped by the aromatic ring of the styrene, possibly resulting in a greater loss to the AC electric field. Therefore, the dissipation factor may be increased. When the content of the styrene-containing resin is more than 35 parts by mass, a polystyrene block as a hard segment increases excessively relative to a polyolefin block as a soft segment. As a result, the mechanical characteristics may be deteriorated (resulting in at least one of decreased tensile strength and decreased tensile elongation). In contrast, when the content of the styrene-containing resin is 35 parts by mass or less, excessive electron trap by the aromatic ring of the styrene can be suppressed and increase of the loss to the AC electric field can be suppressed. As a result, the dissipation factor can be reduced. In addition, when the content of the styrene-containing resin is 35 parts by mass or less, a relative over-increase of the polystyrene block as the hard segment can be suppressed. Accordingly, deterioration in the mechanical characteristics (decrease in tensile strength and decrease in tensile elongation) can be suppressed.

In this embodiment, the content percentage of the styrene in the styrene-containing resin (hereinafter simply referred to as "styrene content percentage") is preferably less than 45% by mass. It should be noted that the term "styrene content percentage in the styrene-containing resin" refers to a mass percentage of the styrene contained in one molecule of the styrene-containing resin.

When the styrene content percentage is 45% by mass or more, the compatibility between the polyethylene and the styrene-containing resin decreases. When the compatibility decreases, there is generated a part where the polystyrene blocks as the hard segments are relatively dense. Therefore, when a water tree is generated, a stress crack may not be sufficiently suppressed in a part where the polystyrene blocks are relatively dense, and the effect of suppressing propagation of the water tree may not be sufficiently obtained. As a result, the maximum length of the water tree may not be sufficiently shortened. When the content percentage of the styrene is 45% by mass or more, electron trap by the aromatic ring of the styrene may be localized, and a loss to the AC electric field may not be sufficiently reduced. For this reason, the dissipation factor may not be sufficiently reduced. In addition, when the styrene content percentage is 45% by mass or more, the polystyrene blocks as the hard segments increase relatively. Accordingly, mechanical characteristics (at least one of tensile strength and tensile elongation) may not be sufficiently improved.

In contrast, when the styrene content percentage is less than 45% by mass, decrease in compatibility between the polyethylene and the styrene-containing resin can be suppressed. When the decrease in the compatibility is suppressed, the generation of the part where the polystyrene blocks as the hard segments are relatively dense can be suppressed. Thereby, stress cracks in the electrical insulation composition can be uniformly suppressed, and the propagation of the water tree can be suppressed. As a result, the maximum length of the water tree can be sufficiently shortened. In addition, when the styrene content percentage is less than 45% by mass, the localized electron trap by the aromatic ring of the styrene can be suppressed, and the loss to the AC electric field can be sufficiently reduced. Thereby, the dissipation factor can be sufficiently reduced. Furthermore, when the content percentage of the styrene-containing resin is less than 45% by mass, a relative increase of the polystyrene block as the hard segment can be suppressed. Thereby, the mechanical characteristics (tensile strength and tensile elongation) can be sufficiently improved.

The lower limit of the content percentage of the styrene in the styrene-containing resin is not particularly limited. However, from the viewpoint of efficiently developing the water tree suppression effect by the styrene-containing resin, the styrene content percentage in the styrene-containing resin is preferably 5% by mass or more, for example.

In this embodiment, the total content of the styrene in the base resin (hereinafter simply referred to as "total styrene content) is preferably 0.15 parts by mass or more and 11 parts by mass or less with respect to 100 parts by mass of the base resin, for example.

When the total styrene content is less than 0.15 parts by mass, the water tree suppression effect by the styrene-containing resin may not be sufficiently obtained. In contrast, when the total styrene content is 0.15 parts by mass or more, the water tree suppression effect by the styrene-containing resin can be sufficiently obtained. On the other hand, when the total styrene content is more than 11 parts by mass, the loss to the AC electric field may not be sufficiently reduced due to the increase of the electron trap by the aromatic ring of the styrene. For this reason, the dissipation factor may not be sufficiently reduced. When the total styrene content is more than 11 parts by mass, the polystyrene blocks as the hard segments relatively increase with respect to the polyolefin blocks as the soft segments. Accordingly, the mechanical characteristics (at least one of tensile strength and tensile elongation) may not be sufficiently improved. In contrast, when the total styrene content is 11 parts by mass or less, the loss to the AC electric field due to the electron trap by the aromatic ring of the styrene can be sufficiently reduced. As a result, the dissipation factor can be sufficiently reduced. In addition, when the total styrene content is 11 parts by mass or less, a relative increase of the polystyrene blocks as the hard segments can be suppressed. Thereby, the mechanical characteristics (tensile strength and tensile elongation) can be sufficiently improved.

(Fatty Acid Amide)

The fatty acid amide is added in the electrical insulation composition, so that the fatty acid amide can act as a lubricant to improve the flowability of the electrical insulation composition in the extrusion step of the insulation layer 130. In addition, the fatty acid amide is dispersed, so that the dispersed polar groups (hydrophilic groups) can suppress the local concentration of water in the electrical insulation composition. As a result, the generation of the water tree in the insulation layer 130 can be suppressed.

Examples of the fatty acid amide include saturated fatty acid monoamides, unsaturated fatty acid monoamides, saturated fatty acid bisamides, and unsaturated fatty acid bisamides.

Specifically, examples of the saturated fatty acid monoamide include lauric acid amide, palmitic acid amide, stearic acid amide, hydroxystearic acid amide, and the like.

Examples of the unsaturated fatty acid monoamide include oleic acid amide, erucic acid amide, and the like.

Examples of the saturated fatty acid bisamide include methylene bisstearic acid amide, ethylene biscapric acid amide, ethylene bislauric acid amide, ethylene bisstearic acid amide, ethylene bishydroxystearic acid amide, ethylene bisbehenic acid amide, hexamethylene bisstearic acid amide, hexamethylene bishydroxystearic acid amide, N,N'-distearyl adipic acid amide, and the like.

Examples of the unsaturated fatty acid bisamide include ethylene bisoleic acid amide, ethylene biserucic acid amide, hexamethylene bisoleic acid amide, N,N'-dioleyl adipic acid amide, N,N'-dioleyl sebacic acid amide, and the like.

It should be noted that two or more of these fatty acid amides may be used in combination.

In this embodiment, the fatty acid amide added in the electrical insulation composition is preferably a fatty acid monoamide, for example. That is, the fatty acid amide preferably has one amide group, for example. Thereby, the polarity of the fatty acid amide can be improved. As a result, the suppression effect on the local concentration of water by the polar group can be improved.

In this embodiment, the fatty acid amide added in the electrical insulation composition is preferably an unsaturated fatty acid amide, for example. That is, the fatty acid amide preferably has an unsaturated bonding moiety (unsaturated group, double bond), for example. Thereby, electrons can be trapped by the dispersed unsaturated bond moieties, and the local electric field concentration can be suppressed.

In this embodiment, the content of the fatty acid amide in the electrical insulation composition is 0.05 parts by mass or more and 1.0 parts by mass or less with respect to 100 parts by mass of the base resin.

When the content of the fatty acid amide is less than 0.05 parts by mass, the water tree suppression effect by the fatty acid amide may not be sufficiently obtained. In contrast, when the content of the fatty acid amide is 0.05 parts by mass or more, the water tree suppression effect by the fatty acid amide can be sufficiently obtained. On the other hand, when the content of the fatty acid amide is more than 1.0 parts by mass, the fatty acid amide may be deposited on the surface of the insulation layer 130 due to the difference in compatibility between the base resin and the fatty acid amide. This phenomenon is referred to as "bloom". In contrast, when the content of the fatty acid amide is 1.0 parts by mass or less, the generation of the bloom due to the difference in compatibility between the base resin and the fatty acid amide can be suppressed.

In this embodiment, since both the fatty acid amide and the above-mentioned styrene-containing resin are added, the water tree resistance can be remarkably improved owing to their synergistic effect.

In this embodiment, the ratio B/A of the total content B of the styrene in the base resin to the content A of the fatty acid amide (hereinafter also referred to as the content ratio B/A) is, for example, preferably 1.5 or more and 110 or less, and more preferably, 2.4 or more and 105 or less.

When the content ratio B/A is less than 1.5, the remarkableness of the water tree suppression effect by both the fatty acid amide and the styrene-containing resin may not be sufficiently obtained. In contrast, when the content ratio B/A is 1.5 or more, the remarkableness of the water tree suppression effect by both the fatty acid amide and the styrene-containing resin can be sufficiently obtained. Furthermore, when the content ratio B/A is 2.4 or more, the remarkableness of the water tree suppression effect by both the fatty acid amide and the styrene-containing resin can be stably obtained.

On the other hand, when the content ratio B/A is more than 110, the flowability improvement effect by the fatty acid amide may not be sufficiently obtained. Therefore, it may be difficult to uniformly disperse the polystyrene blocks. When the content ratio B/A is more than 110, the suppression effect on the local concentration of water by the polar group of the fatty acid amide may not be sufficiently obtained. In contrast, when the content ratio B/A is 110 or less, the flowability improvement effect by the fatty acid amide can be sufficiently obtained. Thereby, the polystyrene blocks can be uniformly dispersed. As a result, increase in the dissipation factor and deterioration in the mechanical characteristics (decrease in tensile strength and decrease in tensile elongation) can be stably suppressed. In addition, when the content ratio B/A is 110 or less, the suppression effect on the local concentration of water by the polar group of the fatty acid amide can be sufficiently obtained. Thereby, a remarkableness of the water tree suppression effect by both the fatty acid amide and the styrene-containing resin can be sufficiently obtained. Moreover, when the content ratio B/A is 105 or less, increase in the dissipation factor and deterioration in the mechanical characteristics (decrease in tensile strength and decrease in tensile elongation) can be surely suppressed. Furthermore, a remarkableness of the water tree suppression effect by both the fatty acid amide and the styrene-containing resin can be more sufficiently obtained.

(Unsaturated Dimer of α-Aromatic Substituted α-Methylalkene)

In this embodiment, the electrical insulation composition may further include, for example, an unsaturated dimer of α-aromatic substituted α-methylalkene.

The unsaturated dimer of the α-aromatic substituted α-methylalkene is added in the electrical insulation composition, so that localized scorch (burn) generated in the extrusion step of the electrical insulation composition can be suppressed. In addition, according to the same principle as that for the styrene-containing resin, electrons can be trapped by the aromatic ring of the unsaturated dimer of the α-aromatic substituted α-methylalkene to form a stable resonance structure. As a result, the generation of the water tree in the insulation layer 130 can be stably suppressed. Note that, the unsaturated dimer of the α-aromatic substituted α-methylalkene may be hereinafter abbreviated as "unsaturated dimer".

A monomer of the α-aromatic substituted α-methylalkene is represented, for example, by the following formula (1).

[Chem. 1]

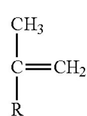

(1)

R indicates any one of an aryl group, an alkaryl group, a halogen substituted aryl group, and a halogen substituted alkaryl group. Note that, the term "alkaryl group" used herein means a combination of one or more aryl groups bonded to one or more alkyl groups.

Specifically, examples of the monomer of the α-aromatic substituted α-methylalkene include α-methylstyrene, para-methyl-α-methylstyrene, para-isopropyl-α-methylstyrene, meta-methyl-α-methylstyrene, meta-ethyl-α-methylstyrene, ar-dimethyl-α-methylstyrene, ar-chloro-α-methylstyrene, ar-chloro-ar-methyl-α-methylstyrene, ar-diethyl-α-methylstyrene, ar-methyl-ar-isopropyl-α-methylstyrene, and the like. It should be noted that two or more of them may be used in combination.

Examples of the unsaturated dimer of the α-aromatic substituted α-methylalkene include an unsaturated dimer of the α-methylstyrene (2,4-diphenyl-4-methyl-1-pentene). It should be noted that two or more of the unsaturated dimer of the α-methylstyrene and other unsaturated dimers may be used in combination.

In this embodiment, the content of the unsaturated dimer of the α-aromatic substituted α-methylalkene in the electrical insulation composition is 0.1 parts by mass or more and 10 parts by mass or less with respect to 100 parts by mass of the base resin.

When the content of the unsaturated dimer is less than 0.1 parts by mass, the water tree suppression effect by the unsaturated dimer may not be sufficiently obtained. In contrast, when the content of the unsaturated dimer is 0.1 parts by mass or more, the water tree suppression effect by the unsaturated dimer can be sufficiently obtained. On the other hand, when the content of the unsaturated dimer is more than 10 parts by mass, the base resin is less likely to crosslink, resulting in decreased gel fraction of the electrical insulation composition. As a result, the dissipation factor may increase when a predetermined AC electric field is applied, or the tensile characteristics of the insulation layer 130 may be deteriorated. In contrast, when the content of the unsaturated dimer is 10 parts by mass or less, a predetermined amount of the base resin can be crosslinked to suppress decrease in the gel fraction of the electrical insulation composition. As a result, increase in the dissipation factor can be suppressed when a predetermined AC electric field is applied, and deterioration in the tensile characteristics of the insulation layer 130 can be suppressed.

(Crosslinking Agent)

In this embodiment, the base resin of the electrical insulation composition is preferably crosslinked by a crosslinking agent, for example. Thereby, the mechanical characteristics (tensile characteristics) and electrical characteristics of the electrical insulation composition can be improved.

As the crosslinking agent added in the electrical insulation composition, for example, an organic peroxide is used. Specifically, examples of the organic peroxide include dicumyl peroxide, 1-(2-tert-butylperoxyisopropyl)-1-isopropylbenzene, 1-(2-tert-butylperoxyisopropyl)-3-isopropylbenzene, 1,3-bis-(tert-butylperoxy-isopropyl)benzene, 2,5-dimethyl-2,5-di(t-butylperoxy)hexane, 2,5-dimethyl-2,5-(tert-butylperoxy)-hexyne-3, and the like. It should be noted that two or more of them may be used in combination.

(Other Additives)

The electrical insulation composition may further include, for example, an antioxidant.

Examples of the antioxidant include, for example, 4,4'-thiobis-(6-t-butyl-3-methylphenol), 2,2-thio-diethylene bis[3-(3,5-di-t-butyl-4-hydroxyphenyl)propionate], pentaerythrityl-tetrakis[3-(3,5-di-t-butyl-4-hydroxyphenyl) propionate], octadecyl 3-(3,5-di-t-butyl-4-hydroxyphenyl) propionate, 2,4-bis-[(octylthio)methyl]-o-cresol, 2,4-bis-(n-octylthio)-6-(4-hydroxy-3,5-di-t-butylanilino)-1,3,5-triazine, bis[2-methyl-4-{3-n-alkyl(C12 or C14)

thiopropionyloxy}-5-t-butylphenyl]sulfide, and the like. It should be noted that two or more of them may be used in combination.

The electrical insulation composition may include a lubricant other than the above-mentioned fatty acid amide as the lubricant. The electrical insulation composition may further include a colorant, for example.

(2) Power Cable

Next, with reference to FIG. 1, the power cable of this embodiment will be described. FIG. 1 is a cross-sectional view orthogonal to the axial direction of the power cable according to this embodiment.

The power cable 10 of this embodiment is configured as a so-called solid insulation power cable. Further, the power cable 10 of this embodiment is configured so as to be laid under water or on the bottom of water. The power cable 10 is used for alternating current, for example.

Specifically, the power cable 10 includes, for example, a conductor 110, an internal semiconductive layer 120, an insulation layer 130, an external semiconductive layer 140, a shielding layer 150, and a sheath 160.

The power cable 10 of this embodiment has the above-mentioned remarkable water tree suppression effect, and therefore does not have a metallic water-shielding layer such as a so-called aluminum cover outside the shielding layer 150, for example. That is, the power cable 10 of this embodiment includes an imperfect water-shielding structure.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided to cover the outer periphery of the conductor 110. In addition, the internal semiconductive layer 120 is configured to have semiconductivity and to suppress electric field concentration on the surface side of the conductor 110. The internal semiconductive layer 120 includes, for example, at least any one of an ethylene-ethyl acrylate copolymer, an ethylene-methyl acrylate copolymer, an ethylene-butyl acrylate copolymer, and an ethylene-vinyl acetate copolymer, together with conductive carbon black.

(Insulation Layer)

The insulation layer 130 is provided to cover the outer periphery of the internal semiconductive layer 120, and includes the above-mentioned electrical insulation composition. For example, the insulation layer 130 is crosslinked by heating the electrical insulation composition after extrusion molding, as mentioned above.

(External Semiconductive Layer)

The external semiconductive layer 140 is provided to cover the outer periphery of the insulation layer 130. In addition, the external semiconductive layer 140 is configured to have semiconductivity and to suppress electric field concentration between the insulation layer 130 and the shielding layer 150. The external semiconductive layer 140 includes, for example, materials similar to those of the internal semiconductive layer 120.

(Shielding Layer)

The shielding layer 150 is provided to cover the outer periphery of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided to cover the outer periphery of the shielding layer 150. The sheath 160 includes, for example, polyvinyl chloride or polyethylene.

(Water Tree Resistance)

In this embodiment, as mentioned above, since both the styrene-containing resin and the fatty acid amide are added in the insulation layer 130, the water tree resistance of the insulation layer 130 is remarkably improved.

Specifically, in this embodiment, the maximum length of the water tree generated in the electrical insulation composition is, for example, less than 200 μm, preferably less than 120 μm, and more preferably 100 μm or less, when an AC electric field of 4 kV/mm at a commercial frequency (e.g., 60 Hz) is applied to the electrical insulation composition for 1,000 hours, with the electrical insulation composition included in the insulation layer 130 being immersed in 1 N NaCl aqueous solution at an ordinary temperature (27° C.). As a result, the dielectric breakdown of the insulation layer 130 caused by the water tree can be stably suppressed.

The maximum length of the water tree generated in the electrical insulation composition is not limited because the smaller maximum length is better. However, in this embodiment, since the water tree may not be generated in some cases, the maximum length of the water tree generated in the electrical insulation composition is, for example, 0 μm or more.

Moreover, in this embodiment, a number density of water trees having a length of 30 μm or more generated in the electrical insulation composition is less than 200 $cm^{-3}$ (200 pieces/$cm^3$), preferably 100 $cm^{-3}$ or less, and more preferably 60 $cm^{-3}$ or less when an AC electric field of 4 kV/mm at a commercial frequency (e.g., 60 Hz) is applied to the electrical insulation composition for 1,000 hours, with the electrical insulation composition included in the insulation layer 130 being immersed in 1 N NaCl aqueous solution at an ordinary temperature (27° C.). As a result, the dielectric breakdown of the insulation layer 130 caused by the water tree can be stably suppressed.

The number density of water trees is not limited because the lower number density of the water trees is better. However, in this embodiment, since the water tree may not be generated in some cases, the number density of the water trees is, for example, 0 $cm^{-3}$ or more.

(Gel Fraction (Crosslinking Degree))

In this embodiment, as mentioned above, the insulation layer 130 is crosslinked, for example. In addition, in the electrical insulation composition included in the insulation layer 130, since the unsaturated dimer of the α-aromatic substituted α-methylalkene is not included or the content of the unsaturated dimer of the α-aromatic substituted α-methylalkene is 10 parts by mass or less, the decrease in the gel fraction of the electrical insulation composition can be suppressed.

Specifically, in this embodiment, the gel fraction of the electrical insulation composition included in the insulation layer 130 is, for example, more than 68%, preferably 70% or more, and more preferably 74% or more.

The gel fraction of the electrical insulation composition is not limited because the higher gel fraction is better. However, in this embodiment, the gel fraction of the electrical insulation composition is, for example, 95% or less.

(Dissipation Factor)

Application of the AC electric field to the electrical insulation composition may cause a loss. Examples of the loss caused by application of the AC electric field include, for example, a loss caused by leakage current, a loss caused by dielectric polarization, a loss caused by partial discharge, and the like. Due to such a loss, the current phase lags behind the lossless current flowing through the ideal electrical insulation composition. A delay angle δ in this case is referred to as a dielectric loss angle, and the tangent is referred to as a dissipation factor (tan δ).

In this embodiment, since the content of the styrene-containing resin is 35 parts by mass or less, increase in the dissipation factor is suppressed.

Specifically, in this embodiment, the dissipation factor is, for example, 0.05% or less, preferably 0.04% or less, when an AC electric field is applied to the electrical insulation composition included in the insulation layer 130 under the following conditions: 90° C., commercial frequency (e.g., 60 Hz), 9 kV/mm.

The dissipation factor is not limited because the smaller dissipation factor is better. However, in the electrical insulation composition of this embodiment, the dielectric loss is, for example, 0.001% or more.

(AC Breakdown Electric Field)

In this embodiment, since the content of the styrene-containing resin is 35 parts by mass or less, a predetermined AC breakdown electric field is ensured.

Specifically, in this embodiment, the AC breakdown electric field of the electrical insulation composition included in the insulation layer 130 is, for example, 55 kV/mm or more, preferably 58 kV/mm or more, as measured under the conditions of ordinary temperature (27° C.) and commercial frequency (e.g., 60 Hz).

The AC breakdown electric field is not limited because the larger AC breakdown electric field is better. However, in the electrical insulation composition of this embodiment, the AC breakdown electric field is, for example, 100 kV/mm or less.

(Tensile Characteristics (Mechanical Characteristics))

In this embodiment, since the styrene-containing resin is included as an elastomer, the tensile strength of the electrical insulation composition can be improved.

Specifically, in this embodiment, the tensile strength of the electrical insulation composition included in the insulation layer 130 is, for example, 12.5 MPa or more, preferably 14 MPa or more, and more preferably 17 MPa or more.

The tensile strength of the electrical insulation composition is not limited because the higher tensile strength is better. However, in the electrical insulation composition of this embodiment, the tensile strength is, for example, 50 MPa or less.

In this embodiment, since the content of the styrene-containing resin is 35 parts by mass or less, the tensile elongation of the electrical insulation composition is ensured.

Specifically, in this embodiment, the tensile elongation of the electrical insulation composition included in the insulation layer 130 is, for example, 350% or more, and preferably 430% or more.

The tensile elongation of the electrical insulation composition is not limited because the larger tensile elongation is better. However, in the electrical insulation composition of this embodiment, the tensile elongation is, for example, 1,000% or less.

As described above, in this embodiment, predetermined tensile characteristics can be ensured. Accordingly, the power cable 10 can be suitably laid even in an environment where the power cable 10 may expand, shrink or bend. Specifically, the power cable 10 of this embodiment can be applied to, for example, an array cable (dynamic cable, riser cable) that is bendably connected underwater to a floating type aquatic facility.

(Bloom)

In this embodiment, as mentioned above, since the content of the fatty acid amide is 1.0 parts by mass or less, bloom due to the difference in compatibility between the base resin and the fatty acid amide is not detected on the surface of the insulation layer 130.

(Specific Dimensions and the Like)

Specific dimensions of the power cable 10 are not particularly limited. For example, the diameter of the conductor 110 is 5 mm or more and 60 mm or less, the thickness of the internal semiconductive layer 120 is 0.5 mm or more and 3 mm or less, the thickness of the insulation layer 130 is 1 mm or more and 35 mm or less, the thickness of the external semiconductive layer 140 is 0.5 mm or more and 3 mm or less, the thickness of the shielding layer 150 is 1 mm or more and 5 mm or less, and the thickness of the sheath 160 is 1 mm or more. The AC voltage applied to the power cable 10 of this embodiment is, for example, 20 kV or more.

(3) Method for Producing Power Cable

Next, a method for producing the power cable of this embodiment will be described. Hereinafter, the step is abbreviated as "S".

(S100: Electrical Insulation Composition Preparation Step)

First, the electrical insulation composition is prepared.

In this embodiment, the base resin containing the polyethylene and the styrene-containing resin, the fatty acid amide, and other additives (crosslinking agent, antioxidant, etc.) are mixed (kneaded) by a mixer such as Banbury mixer or a kneader, to form a mixed material. At this time, when the total content of the base resin is regarded as 100 parts by mass, the content of the polyethylene in the base resin is, for example, 65 parts by mass or more and 98 parts by mass or less, and the content of the styrene-containing resin in the base resin is, for example, 2 parts by mass or more and 35 parts by mass or less. In addition, the content of the fatty acid amide is 0.05 parts by mass or more and 1.0 parts by mass or less with respect to 100 parts by mass of the base resin.

At this time, an unsaturated dimer of α-aromatic substituted α-methylalkene may be further added. In this case, the content of the unsaturated dimer of the α-aromatic substituted α-methylalkene is, for example, 0.1 parts by mass or more and 10 parts by mass or less with respect to 100 parts by mass of the base resin.

After the mixed material is formed, the mixed material is granulated by an extruder. As a result, a pellet-like electrical insulation composition that is to be included in the insulation layer 130 is formed. The steps from the mixing step through the granulation step may be collectively performed using a twin-screw type extruder with high kneading performance.

(S200: Conductor Preparation Step)

Meanwhile, a conductor 110 is prepared which is formed by twisting a plurality of conductor core wires.

(S300: Cable Core Formation Step (Extrusion Step))

After the electrical insulation composition preparation step S100 and the conductor preparation step S200 are completed, for example, a composition for the internal semiconductive layer in which an ethylene-ethyl acrylate copolymer and electrically conductive carbon black are mixed in advance is charged into an extruder A of a three-layer coextruder, the extruder A forming the internal semiconductive layer 120.

The pellet-like electrical insulation composition described above is charged into an extruder B forming the insulation layer 130.

A composition for the external semiconductive layer is charged into an extruder C forming the external semiconductive layer 140, the composition including materials similar to those of the composition for the internal semiconductive layer charged into the extruder A.

Then, the respective extrudates from the extruders A to C are guided to a common head, and the internal semiconductive layer 120, the insulation layer 130, and the external semiconductive layer 140, outwardly from the inside, are simultaneously extruded on the outer periphery of the conductor 110.

After extrusion, at least the insulation layer 130 is crosslinked by heating with radiation from an infrared heater or heat-transferring through a heat medium such as high-temperature nitrogen gas or silicone oil, in a crosslinking tube pressurized with nitrogen gas or the like. Thereafter, the cable core after crosslinking is, for example, cooled with water.

The cable core including the conductor 110, the internal semiconductive layer 120, the insulation layer 130, and the external semiconductive layer 140 is formed by the cable core formation step S300 described above.

(S400: Shielding Layer Formation Step)

After the cable core is formed, the shielding layer 150 is formed on the outside of the external semiconductive layer 140, for example, by winding a copper tape therearound.

(S500: Sheath Formation Step)

After the shielding layer 150 is formed, vinyl chloride is charged into an extruder and extruded from the extruder, to form a sheath 160 on the outer periphery of the shielding layer 150.

As described above, the power cable 10 as the solid insulation power cable is produced.

(4) Effect According to this Embodiment

According to this embodiment, one or more effects described later are achieved.

(a) In this embodiment, since the styrene-containing resin is added as the base resin in the electrical insulation composition, electrons can be trapped by the aromatic ring of the styrene to form a stable resonance structure. Thereby, the localization of electrons can be suppressed, that is, the formation of a local electric field concentration part can be suppressed. Since the formation of the local electric field concentration part is suppressed, the aggregation of water in the electric field concentration part can be suppressed. Thereby, the occurrence of a mechanical strain arising from the water aggregation part can be suppressed. As a result, the generation of the water tree in the insulation layer 130 can be suppressed.

Moreover, in this embodiment, since the styrene-containing resin is added as the base resin in the electrical insulation composition, the styrene-containing resin can be made to act as an elastomer. Since the styrene-containing resin is made to act as the elastomer, the mechanical strain arising from the water aggregation part can be alleviated even when the above-mentioned water aggregation part occurs in the electrical insulation composition. Thereby, the occurrence of mechanical stress cracks in the electrical insulation composition can be suppressed. As a result, the propagation and progression of the water tree can be suppressed.

(b) In this embodiment, since the fatty acid amide is added in the electrical insulation composition, the fatty acid amide can be made to act as a lubricant to improve the flowability of the electrical insulation composition in the extrusion step of the insulation layer 130. As a result, each material in the electrical insulation composition can be uniformly dispersed. Since the fatty acid amide is uniformly dispersed in the electrical insulation composition, the polar groups (hydrophilic groups) of the fatty acid amide can be dispersed. Thereby, the water that has infiltrated in the electrical insulation composition can be dispersed by each polar group, so that the local concentration of water in the electrical insulation composition can be suppressed. Since the local water concentration is suppressed, the occurrence of the mechanical strain arising from the water concentration part (water aggregation part) can be suppressed. As a result, the generation of the water tree in the insulation layer 130 can be suppressed.

(c) According to this embodiment, the water tree resistance can be remarkably improved by the synergistic effect of (a) and (b) mentioned above.

When only one of either the styrene-containing resin or the fatty acid amide is added in the electrical insulation composition, the number density of the water trees generated in the insulation layer 130 decreases to some extent, but the maximum length of the water tree generated in the insulation layer 130 may not be shortened in some cases.

In contrast, in this embodiment, since both the styrene-containing resin and the fatty acid amide are added in the electrical insulation composition, the synergistic effects of (a) and (b) mentioned above can be obtained. That is, the addition of the fatty acid amide can improve the flowability of the electrical insulation composition and uniformly disperse the polystyrene blocks of the styrene-containing resin in the electrical insulation composition.

Since the polystyrene blocks are uniformly dispersed, the electron trap effect by the aromatic ring of the styrene can be uniformly developed, and the formation of the local electric field concentration part can be stably suppressed. Furthermore, since the water that has infiltrated in the electrical insulation composition is dispersed by each polar group of the fatty acid amide, the probability that the water concentrates in the local electric field concentration part can be reduced. Thereby, the generation of the water tree in the insulation layer 130 can be stably suppressed.

Further, since the polystyrene blocks as the hard segments and the polyolefin blocks as the soft segments are uniformly dispersed, the occurrence of mechanical stress cracks can be uniformly suppressed in the electric composition. Thereby, the propagation and progression of the water tree can be stably suppressed.

As a result, in this embodiment, the maximum length of the water tree generated in the insulation layer 130 can be shortened, and the number density of the water trees generated in the insulation layer 130 can be remarkably reduced as well.

Since the water tree resistance is remarkably improved in this way, this embodiment can be suitably applied to an underwater cable or a subaqueous cable that is constantly exposed to water. In addition, since the water tree resistance is remarkably improved, the configuration of the water-shielding layer of the power cable 10 can be simplified. For example, the water-shielding layer may be eliminated or the shielding layer may be configured in a simplified manner. As a result, the cost of the power cable 10 can be reduced.

(d) Since the content of the styrene-containing resin is 2 parts by mass or more, the water tree suppression effect by the styrene-containing resin can be sufficiently obtained. On the other hand, since the content of the styrene-containing resin is 35 parts by mass or less, electrons can be suppressed from being excessively trapped by the aromatic ring of the styrene, and increase in the loss to the AC electric field can be suppressed. As a result, the dissipation factor can be reduced. In addition, since the content of the styrene-containing resin is 35 parts by mass or less, a relative over-increase of the polystyrene block as the hard segment can be suppressed. Accordingly, deterioration in the mechanical characteristics (decrease in tensile strength and decrease in tensile elongation) can be suppressed.

(e) Since the content of the fatty acid amide is 0.05 parts by mass or more, the water tree suppression effect by the fatty acid amide can be sufficiently obtained. On the other hand, since the content of the fatty acid amide is 1.0 parts by mass or less, the generation of the bloom due to the difference in compatibility between the base resin and the fatty acid amide can be suppressed.

According to this embodiment, the water tree resistance can be improved while ensuring various cable characteristics (electrical characteristics, tensile characteristics, bloom suppression characteristics), as in (a) to (e) mentioned above.

(f) In this embodiment, the content percentage of the styrene in the styrene-containing resin is preferably less than 45% by mass. Since the styrene content percentage is less than 45% by mass, decrease in the compatibility between the polyethylene and the styrene-containing resin can be suppressed. Since the decrease in the compatibility is suppressed, the occurrence of a part where the polystyrene blocks as the hard segments are relatively dense can be suppressed. Thereby, stress cracks in the electrical insulation composition can be uniformly suppressed, and the propagation of the water tree can be suppressed. As a result, the maximum length of the water tree can be sufficiently shortened. In addition, since the styrene content percentage is less than 45% by mass, the localized electron trap by the aromatic ring of the styrene can be suppressed, and the loss to the AC electric field can be sufficiently reduced. As a result, the dissipation factor can be sufficiently reduced. Furthermore, since the content percentage of the styrene-containing resin is less than 45% by mass, a relative increase of the polystyrene block as the hard segment can be suppressed. As a result, the mechanical characteristics (tensile strength and tensile elongation) can be sufficiently improved.

(g) In this embodiment, the total content of the styrene in the base resin is preferably 0.15 parts by mass or more and 11 parts by mass or less with respect to 100 parts by mass of the base resin, for example. Since the total styrene content is 0.15 parts by mass or more, the water tree suppression effect by the styrene-containing resin can be sufficiently obtained. On the other hand, since the total styrene content is 11 parts by mass or less, the loss to the AC electric field due to the electron trap by the aromatic ring of the styrene can be sufficiently reduced. As a result, the dissipation factor can be sufficiently reduced. In addition, since the total styrene content is 11 parts by mass or less, a relative increase of the polystyrene block as the hard segment can be suppressed. As a result, the mechanical characteristics (tensile strength and tensile elongation) can be sufficiently improved.

(h) In this embodiment, since the unsaturated dimer of the α-aromatic substituted α-methylalkene is added in the electrical insulation composition, localized scorch (burn) generated in the extrusion step of the electrical insulation composition can be suppressed. Thereby, the formation of the local electric field concentration part resulting from the scorch can be suppressed. In addition, since the unsaturated dimer of the α-aromatic substituted α-methylalkene is added in the electrical insulation composition, electrons can be trapped by the aromatic ring of the unsaturated dimer of the α-aromatic substituted α-methylalkene according to the same principle as that for the styrene-containing resin to suppress the formation of the local electric field concentration part. Since the formation of the local electric field concentration part is suppressed, the aggregation of water in the electric field concentration part can be suppressed. Thereby, the occurrence of a mechanical strain arising from the water aggregation part can be suppressed. As a result, in addition to the water tree suppression effect by both the styrene-containing resin and the fatty acid amide, the generation of the water tree in the insulation layer 130 can be more stably suppressed.

(i) Since the content of the unsaturated dimer of the α-aromatic substituted α-methylalkene is 0.1 parts by mass or more, the water tree suppression effect by the unsaturated dimer can be sufficiently obtained. On the other hand, since the content of the unsaturated dimer is 10 parts by mass or less, a predetermined amount of the base resin can be crosslinked to suppress decrease in the gel fraction of the electrical insulation composition. As a result, increase in the dissipation factor can be suppressed when a predetermined AC electric field is applied, and deterioration in the tensile characteristics of the insulation layer 130 can be suppressed.

(j) The fatty acid amide added in the electrical insulation composition is preferably a fatty acid monoamide. Thereby, the polarity of the fatty acid amide can be improved. Since the polarity of the fatty acid amide is improved, the suppression effect on the local concentration of water by the polar group can be improved. As a result, the generation of the water tree in the insulation layer 130 can be stably suppressed.

(k) The fatty acid amide added in the electrical insulation composition is preferably an unsaturated fatty acid amide. Thereby, electrons can be trapped by the dispersed unsaturated bond moieties (double bonds), and the local electric field concentration can be suppressed. Since the formation of the local electric field concentration part is suppressed, the aggregation of water in the electric field concentration part can be suppressed. As a result, the generation of the water tree in the insulation layer 130 can be stably suppressed.

Other Embodiments of the Disclosure

Although embodiments of the present disclosure have been specifically described, the present disclosure is not limited to the embodiments mentioned above, and various modifications can be made without departing from the scope of the present disclosure.

In the above-mentioned embodiments, the case where the base resin contains polyethylene has been described, but the present disclosure is not limited thereto. For example, the base resin may contain an ethylene copolymer. Examples of the ethylene copolymer include an ethylene-propylene copolymer, an ethylene-methyl acrylate copolymer, an ethylene-ethyl acrylate copolymer, an ethylene-vinyl acetate copolymer, and the like. It should be noted that two or more of them may be used in combination. Since the base resin contains the ethylene copolymer, the dispersibility of the styrene-containing resin, the fatty acid amide, and the unsaturated dimer of the α-aromatic substituted α-methylalkene can be improved at a time of mixing of the electrical insulation composition.

In the above-mentioned embodiments, the case where the power cable 10 does not have a water-shielding layer has been described, but the present disclosure is not limited thereto. The power cable 10 has the above-mentioned remarkable water tree suppression effect, and therefore may have a simple water-shielding layer. Specifically, the simple water-shielding layer is, for example, made of a metallic laminated tape. The metallic laminated tape has, for example, a metallic layer made of aluminum, copper, or the like, and an adhesive layer provided on either side or both sides of the metallic layer. The metallic laminated tape is, for example, longitudinally lapped around the cable core to surround an outer periphery thereof (periphery outside the external semiconductive layer). The water-shielding layer may be provided outside the (electrical) shielding layer, or alternatively may also act as a shielding layer. With such a configuration, the cost of the power cable 10 can be reduced.

In the above-mentioned embodiments, the case where the power cable 10 is laid underwater or on the bottom of water has been described, but the present disclosure is not limited thereto. For example, the power cable 10 may be configured as a so-called overhead wire (overhead power line, overhead insulation wire).

EXAMPLE

Next, examples according to the present disclosure will be described. These examples are illustrative of the present disclosure, and the present disclosure is not limited by these examples.

(1) Preparation of Electrical Insulation Composition

The following materials for each of samples A1 to A14 and B1 to B11 were mixed at 120° C. in an oven roller to form an electrical insulation composition.

[Samples A1 to A14]

(Base Resin) 100 Parts by Mass, in Total

Low-density polyethylene (LDPE) (Density d=0.92 g/cm$^3$, MFR=1.0 g/10 min): 65 parts by mass or more and 98 parts by mass or less Styrene-containing resin: 2 parts by mass or more and 35 parts by mass or less Styrene-butadiene-styrene block copolymer (SBS) (Density d=0.95 g/cm$^3$, MFR=2.6 g/10 min, styrene content percentage 40% by mass)

Hydrogenated styrene-butadiene-styrene block copolymer (SEBS: styrene-ethylene-butylene-styrene block copolymer) (Density d=0.91 g/cm$^3$, MFR=5 g/10 min, styrene content percentage 30% by mass)

Hydrogenated styrene-butadiene-styrene block copolymer (SEBS) (Density d=0.89 g/cm$^3$, MFR=4.5 g/10 min, styrene content percentage 12% by mass)

Hydrogenated styrene-butadiene-styrene block copolymer (SEBS) (Density d=0.93 g/cm$^3$, MFR=3.0 g/10 min, styrene content percentage 43% by mass)

(Fatty Acid Amide)

Stearic acid amide, oleic acid amide, erucic acid amide, ethylene bis-stearic acid amide, ethylene bis-oleic acid amide: 0.1 parts by mass (Unsaturated Dimer)

Unsaturated dimer of α-methylstyrene (2,4-diphenyl-4-methyl-1-pentene): 0.3 parts by mass (Sample A9 only)

(Crosslinking Agent)

Dicumylperoxide: 2 parts by mass, or 2,5-Dimethyl-2,5-di(t-butylperoxy)hexane: 1.3 parts by mass (Antioxidant)

4,4'-Thiobis (6-t-butyl-3-methylphenol): 0.2 parts by mass

[Sample B1]

Sample B1 was prepared in the same manner as Sample A3, except that the content of the polyethylene in the base resin was 100 parts by mass, the base resin containing no styrene-containing resin, and the fatty acid amide was not included.

[Sample B2]

Sample B2 was prepared in the same manner as Sample A3, except that the fatty acid amide was not included.

[Sample B3]

Sample B3 was prepared in the same manner as Sample A3, except that the content of the polyethylene in the base resin was 100 parts by mass, the base resin containing no styrene-containing resin.

[Sample B4]

Sample B4 was prepared in the same manner as Sample A3, except that the content of the styrene-containing resin was 1.5 parts by mass.

[Sample B5]

Sample B5 was prepared in the same manner as Sample A3, except that the content of the styrene-containing resin was 38 parts by mass.

[Sample B6]

Sample B6 was prepared in the same manner as Sample A3, except that the following styrene-containing resin was used.

Hydrogenated styrene-butadiene-styrene block copolymer (SEBS) (Density d=0.97 g/cm$^3$, MFR=2.0 g/10 min, styrene content percentage 67% by mass): 20 parts by mass

[Sample B7]

Sample B7 was prepared in the same manner as Sample A7, except that the total content of the styrene in the base resin was 0.12 parts by mass.

[Sample B8]

Sample B8 was prepared in the same manner as Sample A8, except that the total content of the styrene in the base resin was 12.9 parts by mass.

[Sample B9]

Sample B9 was prepared in the same manner as Sample B6, except that the content of SEBS having the styrene content percentage of 67% by mass was 10 parts by mass.

[Sample B10]

Sample B10 was prepared in the same manner as Sample A3, except that the content of the fatty acid amide was 0.02 parts by mass.

[Sample B11]

Sample B11 was prepared in the same manner as Sample A3, except that the content of the fatty acid amide was 1.5 parts by mass.

(2) Evaluation

The above-mentioned electrical insulation composition was used to fabricate an insulation sheet for each of evaluations, and then each of the evaluations was performed.

(Evaluation 1: Water Tree Resistance)

After the above-mentioned electrical insulation composition was formed, the electrical insulation composition was pressed by press molding at 120° C. for 10 minutes, to fabricate two insulation sheets having a thickness of 1 mm. After the insulation sheet was fabricated, a predetermined semiconductive sheet was sandwiched between the two insulation sheets to form a laminated sheet. After the laminated sheet was formed, the laminated sheet was pressed by press molding at 180° C. for 30 minutes to crosslink the base resin of the insulation sheet. After the insulation sheet was crosslinked, wiring was formed on the semiconductive sheet.

Subsequently, an AC electric field of 4 kV/mm at 60 Hz was applied to the insulation sheet between the semiconductive sheet and the aqueous solution for 1,000 hours, with the laminated sheet being immersed in 1 N NaCl aqueous solution at an ordinary temperature (27° C.).

After the predetermined AC electric field was applied, the laminated sheet was dried, and stained with an aqueous solution of methylene blue while the laminated sheet was boiled. After the laminated sheet was stained, the laminated sheet was sliced to a thickness of 30 μm along the lamination direction (that is, a direction orthogonal to a main surface of the laminated sheet) to form a slice for observation. After that, the slice for observation was observed with an optical microscope, so that the water tree generated in a direction along a surface of the semiconductive sheet or in a direction orthogonal to a main surface of the semiconductive sheet was observed in the insulation sheet of the slice for observation. At that time, the maximum length of the water tree generated in the insulation sheet was measured. In addition, the number density of the water tree having a length of 30 μm or more which was generated in the insulation sheet was measured. In Tables 1 and 2 shown below, the "maximum length of the water tree" was determined by rounding off the length of the water tree, which was the longest of the 10 slices for observation which were randomly sampled. The "number density of the water tree generated" was calculated by rounding off an average value of the number densities of the water trees generated in 10 slices for observation which were randomly sampled.

Just for information, in the conventional evaluation of a water tree resistance, a power cable having an insulation layer including a predetermined electrical insulation composition was fabricated, and the power cable was immersed in water, and the water tree was evaluated. In that case, a shielding layer and a sheath were provided outside the insulation layer of the power cable. Therefore, the insulation layer did not come into direct contact with water. In contrast, in this example, the laminated sheet was directly immersed in a predetermined aqueous solution, and the water tree was evaluated, as mentioned above. Accordingly, the insulation sheet was brought into direct contact with the aqueous solution. Therefore, the evaluation of the water tree resistance in this example is supposed to be performed under more stringent conditions than those of the evaluation using the conventional power cable.

(Evaluation 2: Dissipation Factor)

After the above-mentioned electrical insulation composition was formed, the electrical insulation composition was pressed by press molding at 180° C. for 30 minutes, to fabricate an insulation sheet having a thickness of 0.2 mm. At that time, the insulation sheet was pressed at 180° C. for 30 minutes to crosslink the base resin of the insulation sheet.

Next, using a Schering bridge, an AC electric field was applied to the insulation sheet under the conditions of 90° C., commercial frequency (for example, 60 Hz), and 9 kV/mm, and the dissipation factor was measured.

(Evaluation 3: AC Breakdown Electric Field)

An insulation sheet similar to those for Evaluation 2 mentioned above was fabricated. Next, an AC voltage of 5 kV was applied to the insulation sheet for 1 minute under the conditions of ordinary temperature (27° C.) and commercial frequency (for example, 60 Hz). Thereafter, the cycle including increasing AC voltage applied to the insulation sheet by 1 kV and applying the AC voltage to the insulation sheet for 1 minute, was repeated. Then, the electric field when dielectric breakdown occurred was measured in the insulation sheet.

(Evaluation 4: Gel Fraction (Crosslinking Degree))

After the above-mentioned electrical insulation composition was formed, the electrical insulation composition was pressed by press molding at 180° C. for 30 minutes, to fabricate an insulation sheet having a thickness of 1 mm. At that time, the insulation sheet was pressed at 180° C. for 30 minutes to crosslink the base resin of the insulation sheet.

After the insulation sheet was fabricated, gel fraction was measured according to JIS C3005. Specifically, a mass of the insulation sheet was measured first. Subsequently, the insulation sheet was immersed in a predetermined solvent (e.g., hot xylene) to dissolve the insulation sheet. At that time, a part of the insulation sheet in which the base resin had been crosslinked was not dissolved and remained as a gel. After the insulation sheet was allowed to dissolve, a mass of the gel remaining undissolved was measured. Consequently, a ratio (%) of the mass of the remaining gel to the mass of the insulation sheet before dissolution was calculated to determine a "gel fraction".

(Evaluation 5: Tensile Characteristics)

An insulation sheet similar to that for Evaluation 4 mentioned above was fabricated. Next, the tensile strength and the tensile elongation of the insulation sheet were measured according to JIS C3005. Specifically, the insulation sheet was pulled at a tension rate of 200 mm/min using a JIS-3 dumbbell, and the tensile strength and the tensile elongation of the insulation sheet were measured.

(Evaluation 6: Bloom)

Pellets of the electrical insulation composition were kept in a thermostatic chamber at 80° C. for 10 days, and then the surface thereof was visually observed. The pellets were observed to evaluate the presence of the bloom deposited on the surface of the pellet. The case where no bloom was generated was designated as "A", and the case where bloom was generated was designated as "B".

(3) Results

With reference to the following Tables 1 and 2, the evaluation result of each sample will be described. In the following Tables 1 and 2, the content of each of the compounded agents is expressed in "part(s) by mass". In addition, in the following Tables 1 and 2, "St" in brackets for the styrene-containing resin refers to the styrene content percentage.

TABLE 1

| | | | A1 | A2 | A3 | A4 | A5 | A6 | A7 | A8 | A9 | A10 | A11 | A12 | A13 | A14 |
|---|---|---|---|---|---|---|---|---|---|---|---|---|---|---|---|---|
| Composition | LDPE (Density d = 0.920, MFR = 1 g/10 min) | | 80 | 80 | 80 | 80 | 80 | 80 | 80 | 80 | 80 | 80 | 98 | 65 | 98 | 65 |
| | Styrene-containing resin | SEBS (Density d = 0.95, MFR = 2.6 g/10 min, St40%) | | | | | | 20 | | | | | | | | |
| | | SEBS (Density d = 0.91, MFR = 5 g/10 min, St30%) | 20 | 20 | 20 | 20 | 20 | | | | 20 | 20 | 2 | 35 | | |

TABLE 1-continued

| | | | A1 | A2 | A3 | A4 | A5 | A6 | A7 | A8 | A9 | A10 | A11 | A12 | A13 | A14 |
|---|---|---|---|---|---|---|---|---|---|---|---|---|---|---|---|---|
| | | SEBS (Density d = 0.89, MFR = 4.5 g/10 min, St12%) | | | | | | | 20 | | | | | | 2 | 35 |
| | | SEBS (Density d = 0.93, MFR = 3.0 g/10 min, St43%) | | | | | | | | 20 | | | | | | |
| | | SEBS (Density d = 0.97, MFR = 2.0 g/10 min, St67%) | | | | | | | | | | | | | | |
| | Fatty acid amide | Stearic acid amide | 0.1 | | | | | | | | | | | | | |
| | | Oleic acid amide | | 0.1 | | | | | | | | | | | | |
| | | Eructic acid amide | | | 0.1 | | | 0.1 | 0.1 | 0.1 | 0.1 | 0.1 | 0.1 | 0.1 | 0.1 | 0.1 |
| | | Ethylene bisstearic acid amide | | | | 0.1 | | | | | | | | | | |
| | | Ethylene bisoleic acid amide | | | | | 0.1 | | | | | | | | | |
| | Unsaturated dimer | α-Methylstyrene dimer | | | | | | | | | 0.3 | | | | | |
| | Crosslinking agent | Diomyl peroxide | 2 | 2 | 2 | 2 | 2 | 2 | 2 | 2 | 2 | | 2 | 2 | 2 | 2 |
| | | 2,5-Dimethyl-2,5-di(t-butylperoxy)hexane | | | | | | | | | | 1.3 | | | | |
| | Antioxidant | 4,4'-Thiobis(8-t-butyl-3-methylphenol) | 0.2 | 0.2 | 0.2 | 0.2 | 0.2 | 0.2 | 0.2 | 0.2 | 0.2 | 0.2 | 0.2 | 0.2 | 0.2 | 0.2 |
| Total content of styrene in resin (parts by mass) | | | 6 | 6 | 6 | 6 | 6 | 8 | 2.4 | 8.6 | 6 | 8 | 0.8 | 10.5 | 0.24 | 4.2 |
| Evaluation 1 | Bow-tie-like water tree | Maximum length (μm) | 0 | 0 | 0 | 0 | 0 | 40 | 0 | 60 | 0 | 0 | 80 | 0 | 70 | 0 |
| | | Number density of generated water tree of 30 μm or more ($cm^{-2}$) | 0 | 0 | 0 | 0 | 0 | 10 | 0 | 20 | 0 | 0 | 40 | 0 | 50 | 0 |
| Evaluation 2 | Dissipation factor (%) | | 0.02 | 0.02 | 0.02 | 0.03 | 0.03 | 0.02 | 0.02 | 0.02 | 0.03 | 0.02 | 0.01 | 0.04 | 0.01 | 0.04 |
| Evaluation 3 | AC Breakdown electric field (kV/mm) | | 69 | 70 | 68 | 86 | 68 | 82 | 70 | 85 | 70 | 71 | 72 | 68 | 72 | 64 |
| Evaluation 4 | Gel fraction (%) | | 84 | 84 | 84 | 84 | 84 | 83 | 84 | 83 | 82 | 81 | 84 | 78 | 84 | 78 |
| Evaluation 5 | Tensile characteristic | Tensile strength (MPa) | 21 | 22 | 22 | 21 | 21 | 19 | 23 | 19 | 20 | 23 | 24 | 21 | 24 | 18 |
| | | Tensile elongation (%) | 500 | 560 | 540 | 460 | 520 | 430 | 700 | 450 | 470 | 850 | 850 | 480 | 730 | 750 |
| Evaluation 6 | Presence of broom | (A or B) | A | A | A | A | A | A | A | A | A | A | A | A | A | A |

TABLE 2

| | | | B1 | B2 | B3 | B4 | B5 | B6 | B7 | B8 | B9 | B10 | B11 |
|---|---|---|---|---|---|---|---|---|---|---|---|---|---|
| Composition | LDPE (Density d = 0.920, MFR = 1 g/10 min) | | 100 | 80 | 100 | 98.5 | 62 | 80 | 89 | 70 | 90 | 80 | 80 |
| | Styrene-containing resin | SEBS (Density d = 0.95, MFR = 2.6 g/10 min, St40%) | | | | | | 20 | | | | | |
| | | SEBS (Density d = 0.91, MFR = 5 g/10 min, St30%) | | 20 | | 1.5 | 38 | | | | | 20 | 20 |
| | | SEBS (Density d = 0.89, MFR = 4.5 g/10 min, St12%) | | | | | | | 1 | | | | |
| | | SEBS (Density d = 0.93, MFR = 3.0 g/10 min, St43%) | | | | | | | | 30 | | | |
| | | SEBS (Density d = 0.97, MFR = 2.0 g/10 min, St67%) | | | | | | 20 | | | 10 | | |
| | Fatty acid amide | Stearic acid amide | | | | | | | | | | | |
| | | Oleic acid amide | | | | | | | | | | | |
| | | Eructic acid amide | | | 0.1 | 0.1 | 0.1 | 0.1 | 0.1 | 0.1 | 0.1 | 0.02 | 1.5 |
| | | Ethylene bisstearic acid amide | | | | | | | | | | | |
| | | Ethylene bisoleic acid amide | | | | | | | | | | | |
| | Unsaturated dimer | α-Methylstyrene dimer | | | | | | | | | | | |
| | Crosslinking agent | Diomyl peroxide | 2 | 2 | 2 | 2 | 2 | 2 | 2 | 2 | 2 | 2 | 2 |
| | | 2,5-Dimethyl-2,5-di(t-butylperoxy)hexane | | | | | | | | | | | |
| | Antioxidant | 4,4'-Thiobis(8-t-butyl-3-methylphenol) | 0.2 | 0.2 | 0.2 | 0.2 | 0.2 | 0.2 | 0.2 | 0.2 | 0.2 | 0.2 | 0.2 |

TABLE 2-continued

| | | | B1 | B2 | B3 | B4 | B5 | B6 | B7 | B8 | B9 | B10 | B11 |
|---|---|---|---|---|---|---|---|---|---|---|---|---|---|
| Total content of styrene in resin (parts by mass) | | | 0 | 8 | 0 | 0.45 | 11.4 | 13.4 | 0.12 | 12.9 | 6.7 | 8 | 8 |
| Evaluation 1 | Bow-tie-like water tree | Maximum length (μm) | 280 | 220 | 280 | 120 | 0 | 190 | 260 | 0 | 180 | 210 | 0 |
| | | Number density of generated water tree of 30 μm or more ($cm^{-2}$) | 1300 | 400 | 800 | 240 | 0 | 100 | 350 | 0 | 100 | 260 | 0 |
| Evaluation 2 | Dissipation factor (%) | | 0.01 | 0.02 | 0.01 | 0.02 | 0.06 | 0.06 | 0.05 | 0.01 | 0.05 | 0.05 | 0.01 |
| Evaluation 3 | AC Breakdown electric field (kV/mm) | | 70 | 72 | 68 | 89 | 53 | 55 | 71 | 57 | 68 | 72 | 67 |
| Evaluation 4 | Gel fraction (%) | | 84 | 83 | 84 | 84 | 75 | 72 | 84 | 73 | 76 | 83 | 83 |
| Evaluation 5 | Tensile characteristic | Tensile strength (MPa) | 24 | 23 | 24 | 23 | 17 | 15 | 23 | 18 | 17 | 21 | 20 |
| | | Tensile elongation (%) | 650 | 530 | 660 | 700 | 280 | 350 | 640 | 350 | 360 | 530 | 480 |
| Evaluation 6 | Presence of broom | (A or B) | A | A | A | A | A | A | A | A | A | A | B |

As illustrated in Table 2, in Sample B1 to which was added neither the styrene-containing resin nor the fatty acid amide, the number density of the generated water trees was high and the maximum length of the water tree was long. In Sample B2 to which was added only the styrene-containing resin, the number density of the generated water trees was lower than that of Sample B1 and the maximum length of the water tree was slightly shorter than that of Sample B1, but the maximum length of the water tree was long. In Sample B3 to which was added only the fatty acid amide, the number density of the generated water trees was lower than that of Sample B1, but the maximum length of the water tree was long, as with in Sample B1.

In contrast, as illustrated in Table 1, in Samples A1 to A14 to which were added both the styrene-containing resin and the fatty acid amide, the number density of the generated water trees was 60 $cm^{-3}$ or less, which was remarkably lower than those of Samples B1 to B3. Moreover, in Samples A1 to A14, the maximum length of the water tree was 100 μm or less, which was shorter than those of Samples B1 to B3.

Based on these results, it is confirmed that since both the styrene-containing resin and the fatty acid amide are added, their synergistic effect can shorten the maximum length of the water tree generated in the insulation layer, and remarkably reduce the number density of the water trees generated in the insulation layer as well.

Further, as illustrated in Table 2, in Sample B4 (and Sample B7) in which the content of the styrene-containing resin was less than 2 parts by mass, the number density of the generated water trees was less than that of Sample B1, but 200 $cm^{-3}$ or more. Moreover, in Sample B4, the maximum length of the water tree was shorter than those of Samples B1 to B3, but 120 μm or more.

In contrast, as illustrated in Table 1, in Samples A1 to A14 in which the content of the styrene-containing resin was 2 parts by mass or more, the number density of the generated water trees was remarkably less than that of Sample B4. Moreover, in Samples A1 to A14, the maximum length of the water tree was even shorter than that of Sample B4.

Based on these results, it is confirmed that since the content of the styrene-containing resin is 2 parts by mass or more, the water tree suppression effect by the styrene-containing resin can be sufficiently obtained.

Further, as illustrated in Table 2, in Sample B5 in which the content of the styrene-containing resin was more than 35 parts by mass, the dissipation factor was large and the tensile elongation was short.

In contrast, as illustrated in Table 1, in Samples A1 to A14 in which the content of the styrene-containing resin was 35 parts by mass or less, the dissipation factor was 0.05% or less, which was smaller than that of Sample B5. Moreover, in Samples A1 to A14, the tensile elongation was 430% or more, which was longer than that of Sample B5.

Based on these results, since the content of the styrene-containing resin is 35 parts by mass or less, excessive electron trap by the aromatic ring of the styrene can be suppressed, and increase in the loss to the AC electric field can be suppressed. Accordingly, it is confirmed that the dissipation factor can be reduced. In addition, since the content of the styrene-containing resin is 35 parts by mass or less, a relative over-increase of the polystyrene block as the hard segment can be suppressed. Thereby, it is confirmed that the decrease in the tensile elongation can be suppressed.

Further, as illustrated in Table 2, in Samples B6 and B9 in which the content percentage of the styrene in the styrene-containing resin was 45% by mass or more, the maximum length of the water tree was within the above-mentioned specified range (less than 200 μm), but close to the upper limit. Moreover, in Samples B6 and B9, the dissipation factor was within the above-mentioned specified range (0.05% or less), but equal to the upper limit thereof. Furthermore, in Samples B6 and B9, the tensile elongation was within the above-mentioned specified range (350% or more), but equal to the lower limit thereof, or close to the lower limit thereof.

In contrast, as illustrated in Table 1, in Samples A1 to A14 in which the content percentage of the styrene in the styrene-containing resin was less than 45% by mass, the maximum length of the water tree was 100 μm or less, which was even shorter than those of Samples B6 and B9. Further, in Samples A1 to A14, the dissipation factor was 0.04% or less, which was smaller than those of Samples B6 and B9. Furthermore, in Samples A1 to A14, the tensile elongation was 430% or more, which was longer than those of Samples B6 and B9.

Based on these results, since the content percentage of the styrene is less than 45% by mass, the stress cracks in the electrical insulation composition can be uniformly suppressed, and the propagation of the water tree can be suppressed. As a result, it is confirmed that the maximum length of the water tree can be sufficiently shortened. In addition, since the styrene content percentage is less than 45% by mass, the localized electron trap by the aromatic ring of the styrene can be suppressed, and the loss to the AC electric field can be sufficiently reduced. Thereby, it is confirmed that the dissipation factor can be sufficiently reduced. Furthermore, since the content percentage of the styrene is less than 45% by mass, a relative increase of the polystyrene block as the hard segment can be suppressed. Thereby, it is confirmed that the tensile elongation can be sufficiently increased.

Further, as illustrated in Table 2, in Sample B7 in which the total content of the styrene in the base resin was less than 0.15 parts by mass, the number density of the generated water trees was less than those of Sample B1 to B3, but 200 $cm^{-3}$ or more. Moreover, in Sample B7, the maximum length of the water tree was shorter than those of Samples B1 to B3, but 200 μm or more. In Sample B7, the low water tree resistance is considered to be contributed by the content of the styrene-containing resin of less than 2 parts by mass.

In contrast, as illustrated in Table 1, in Samples A1 to A14 in which the total content of the styrene in the base resin was 0.15 parts by mass or more, the number density of the generated water trees was remarkably less than that of Sample B7. Moreover, in Samples A1 to A14, the maximum length of the water tree was even shorter than that of Sample B7.

Based on these results, it is confirmed that since the total content of the styrene in the base resin is 0.15 parts by mass or more, the water tree suppression effect by the styrene-containing resin can be sufficiently obtained.

Further, as illustrated in Table 2, in Sample B8 in which the total content of the styrene in the base resin was more than 11 parts by mass, the dissipation factor was within the above-mentioned specified range (0.05% or less), but equal to the upper limit thereof. Furthermore, in Sample B8, the tensile elongation was within the above-mentioned specified range (350% or more), but equal to the lower limit thereof.

In contrast, as illustrated in Table 1, in Samples A1 to A14 in which the total content of the styrene in the base resin was 11 parts by mass or less, the dissipation factor was 0.04% or less, which was smaller than that of Sample B8. Moreover, in Samples A1 to A14, the tensile elongation was 430% or more, which was longer than that of Sample B8.

Based on these results, since the total content of the styrene in the base resin is 11 parts by mass or less, the loss to the AC electric field due to the electron trap by the aromatic ring of the styrene can be sufficiently reduced. Thereby, it is confirmed that the dissipation factor can be sufficiently reduced. In addition, since the total styrene content is 11 parts by mass or less, a relative increase of the polystyrene block as the hard segment can be suppressed. Thereby, it is confirmed that the tensile elongation can be sufficiently increased.

Further, as illustrated in Table 2, in Sample B10 in which the content of the fatty acid amide was less than 0.05 parts by mass, the number density of the generated water trees was lower than that of Sample B1, but 200 $cm^{-3}$ or more. Furthermore, in Sample B10, the maximum length of the water tree was slightly shorter than those of Samples B1 to B3, but more than 200 μm.

In contrast, as illustrated in Table 1, in Samples A1 to A14 in which the content of the fatty acid amide was 0.05 parts by mass or more, the number density of the generated water trees was remarkably less than that of Sample B10. Further, in Samples A1 to A14, the maximum length of the water tree was shorter than that of Sample B10.

Based on these results, it is confirmed that since the content of the fatty acid amide is 0.05 parts by mass or more, the water tree suppression effect by the fatty acid amide can be sufficiently obtained.

Further, as illustrated in Table 2, in Sample B11 in which the content of the fatty acid amide was more than 1.0 parts by mass, bloom was generated.

In contrast, as illustrated in Table 1, in Samples A1 to A14 in which the content of the fatty acid amide was 1.0 parts by mass or less, bloom was not generated.

Based on these results, it is confirmed that since the content of the fatty acid amide is 1.0 parts by mass or less, the generation of the bloom due to the difference in compatibility between the base resin and the fatty acid amide can be suppressed.

Further, as illustrated in Table 1, in Samples A1 to A14, a ratio B/A of the total content B of the styrene in the base resin to the content A of the fatty acid amide was 1.5 or more and 110 or less. It is confirmed that since the content ratio B/A is 1.5 or more, the remarkableness of the water tree suppression effect by both the fatty acid amide and the styrene-containing resin can be stably obtained as mentioned above. Further, since the content ratio B/A is 110 or less, the polystyrene blocks can be uniformly dispersed. As a result, it is confirmed that increase in the dissipation factor and decrease in tensile elongation can be stably suppressed. Furthermore, it is confirmed that since the content ratio B/A is 110 or less, the remarkableness of the water tree suppression effect by both the fatty acid amide and the styrene-containing resin can be sufficiently obtained due to the suppression effect on the local concentration of water by the polar group of the fatty acid amide.

As described above, with the samples A1 to A14, a remarkable water tree suppression effect can be confirmed under stringent conditions in which the insulation sheet is brought into direct contact with the aqueous solution. Therefore, it is confirmed that since the power cable is produced which includes the insulation layer including the electrical insulation composition of each of samples A1 to A14, the generation of water trees in the insulation layer can be stably suppressed.

<Preferred Aspect of the Disclosure>

Hereinafter, supplementary descriptions of the preferred aspects of the present disclosure will be given.

(Supplementary Description 1)

An electrical insulation composition, including:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

(Supplementary Description 2)

The electrical insulation composition according to supplementary description 1, wherein a maximum length of a water tree generated in the electrical insulation composition is less than 200 μm when an AC electric field of 4 kV/mm at a commercial frequency is applied to the electrical insulation composition for 1,000 hours, with the electrical insulation composition including the base resin and the fatty acid amide being immersed in 1 N NaCl aqueous solution at an ordinary temperature.

(Supplementary Description 3)

The electrical insulation composition according to supplementary description 1 or 2, wherein a number density of water trees having a length of 30 μm or more generated in the electrical insulation composition is less than 200 $cm^{-3}$ when an AC electric field of 4 kV/mm at a commercial frequency is applied to the electrical insulation composition for 1,000 hours, with the electrical insulation composition including the base resin and the fatty acid amide being immersed in 1 N NaCl aqueous solution at an ordinary temperature.

(Supplementary Description 4)

The electrical insulation composition according to any one of supplementary descriptions 1 to 3, wherein a content percentage of styrene in the styrene-containing resin is less than 45% by mass.

(Supplementary Description 5)

The electrical insulation composition according to any one of supplementary descriptions 1 to 4, wherein a total content of the styrene in the base resin is 0.15 parts by mass or more and 11 parts by mass or less with respect to 100 parts by mass of the base resin.

(Supplementary Description 6)

The electrical insulation composition according to any one of supplementary descriptions 1 to 5, wherein a ratio of the total content of the styrene in the base resin to a content of the fatty acid amide is 1.5 or more and 110 or less.

(Supplementary Description 7)

The electrical insulation composition according to any one of supplementary descriptions 1 to 6, further including 0.1 parts by mass or more and 10 parts by mass or less of an unsaturated dimer of α-aromatic substituted α-methylalkene.

(Supplementary Description 8)

The electrical insulation composition according to any one of supplementary descriptions 1 to 7, wherein the fatty acid amide is a fatty acid monoamide.

(Supplementary Description 9)

The electrical insulation composition according to any one of supplementary descriptions 1 to 8, wherein the fatty acid amide is an unsaturated fatty acid amide.

(Supplementary Description 10)

The electrical insulation composition according to any one of supplementary descriptions 1 to 9, further including a crosslinking agent containing an organic peroxide.

(Supplementary Description 11)

The electrical insulation composition according to any one of supplementary descriptions 1 to 9, wherein the base resin is crosslinked.

(Supplementary Description 12)

A power cable including:

a conductor, and an insulation layer provided to cover an outer periphery of the conductor;

the insulation layer including an electrical insulation composition including:

a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, and 0.05 parts by mass or more and 1.0 parts by mass or less of a fatty acid amide.

(Supplementary Description 13)

A method for producing a power cable, including:

preparing an electrical insulation composition, and forming an insulation layer with the electrical insulation composition to cover an outer periphery of a conductor, wherein, in the preparation of the electrical insulation composition, a base resin containing 65 parts by mass or more and 98 parts by mass or less of a polyethylene and 2 parts by mass or more and 35 parts by mass or less of a styrene-containing resin, the polyethylene and the styrene-containing resin totaling 100 parts by mass, is mixed with 0.05 parts by mass or more and 1.0 parts by mass or less of a fatty acid amide to form the electrical insulation composition.

DESCRIPTION OF SIGNS AND NUMERALS

10 Power cable
110 Conductor
120 Internal semiconductive layer
130 Insulation layer
140 External semiconductive layer
150 Shielding layer
160 Sheath

The invention claimed is:

1. An electrical insulation composition included in an insulation layer of a power cable, the electrical insulation composition comprising:

a base resin containing 65 parts by mass or more and 98 parts by mass or less of a polyethylene and 2 parts by mass or more and 35 parts by mass or less of styrene-based thermoplastic elastomer, the polyethylene and the styrene-based thermoplastic elastomer totaling 100 parts by mass; and 0.05 parts by mass or more and 1.0 parts by mass or less of a fatty acid amide, wherein no constitutional unit containing an oxygen atom is bonded to the polyethylene, a density of the polyethylene is 0.91 $g/cm^3$ or more and 0.945 $g/cm^3$ or less, the base resin is crosslinked with an organic peroxide, and a gel fraction of the electrical insulation composition is more than 68%.

2. The electrical insulation composition according to claim 1, wherein a maximum length of a water tree generated in the electrical insulation composition is less than 200 μm when an AC electric field of 4 kV/mm at a commercial frequency is applied to the electrical insulation composition for 1,000 hours, with the electrical insulation composition comprising the base resin and the fatty acid amide being immersed in 1 N NaCl aqueous solution at 27° C.

3. The electrical insulation composition according to claim 1, wherein a number density of water trees having a length of 30 μm or more generated in the electrical insulation composition is less than 200 cm-3 when an AC electric field of 4 kV/mm at a commercial frequency is applied to the electrical insulation composition for 1,000 hours, with the electrical insulation composition comprising the base resin and the fatty acid amide being immersed in 1 N NaCl aqueous solution at 27° C.

4. The electrical insulation composition according to claim 1, wherein a content percentage of styrene in the styrene-based thermoplastic elastomer is less than 45% by mass.

5. The electrical insulation composition according to claim 1, wherein a total content of the styrene in the base resin is 0.15 parts by mass or more and 11 parts by mass or less with respect to 100 parts by mass of the base resin.

6. The electrical insulation composition according to claim 1, wherein a ratio of the total content of the styrene in the base resin to a content of the fatty acid amide is 1.5 or more and 110 or less.

7. The electrical insulation composition according to claim 1, further comprising 0.1 parts by mass or more and 10 parts by mass or less of an unsaturated dimer of α-aromatic substituted α-methylalkene.

8. The electrical insulation composition according to claim 1, wherein the fatty acid amide is a fatty acid monoamide.

9. The electrical insulation composition according to claim 1, wherein the fatty acid amide is an unsaturated fatty acid amide.

10. A power cable comprising:

a conductor; and an insulation layer provided to cover an outer periphery of the conductor, the insulation layer including an electrical insulation composition comprising:

a base resin containing 65 parts by mass or more and 98 parts by mass or less of a polyethylene and 2 parts by mass or more and 35 parts by mass or less of a styrene-based thermoplastic elastomer, the polyethylene and the styrene-based thermoplastic elastomer totaling 100 parts by mass, and 0.05 parts by mass or more and 1.0 parts by mass or less of a fatty acid amide, wherein no constitutional unit containing an oxygen atom is bonded to the polyethylene, a density of the polyethylene is 0.91 $g/cm^3$ or more and 0.945 $g/cm^3$ or less, the base resin is crosslinked with an organic peroxide, and a gel fraction of the electrical insulation composition is more than 68%.

11. The power cable according to claim 10, wherein a maximum length of a water tree generated in the electrical insulation composition is less than 200 μm when an AC electric field of 4 kV/mm at a commercial frequency is applied to the electrical insulation composition for 1,000 hours, with the electrical insulation composition being immersed in 1 N NaCl aqueous solution at 27° C.

12. The power cable according to claim 10, wherein a number density of water trees having a length of 30 μm or more generated in the electrical insulation composition is less than 200 cm 3 when an AC electric field of 4 kV/mm at a commercial frequency is applied to the electrical insulation composition for 1,000 hours, with the electrical insulation composition being immersed in 1 N NaCl aqueous solution at 27° C.

13. The power cable according to claim 10, wherein a content percentage of styrene in the styrene-based thermoplastic elastomer is less than 45% by mass.

14. The power cable according to claim 10, wherein a total content of the styrene in the base resin is 0.15 parts by mass or more and 11 parts by mass or less with respect to 100 parts by mass of the base resin.

15. The power cable according to claim 10, wherein a ratio of the total content of the styrene in the base resin to a content of the fatty acid amide is 1.5 or more and 110 or less.

16. The power cable according to claim 10, wherein the electrical insulation composition further comprising 0.1 parts by mass or more and 10 parts by mass or less of an unsaturated dimer of α-aromatic substituted α-methylalkene.

17. The power cable according to claim 10, wherein the fatty acid amide is a fatty acid monoamide.

18. The power cable according to claim 10, wherein the fatty acid amide is an unsaturated fatty acid amide.

19. The electrical insulation composition according to claim 1, wherein the base resin has crosslinking points which do not contain silicon atoms.

20. The power cable according to claim 10, wherein the base resin has crosslinking points which do not contain silicon atoms.

21. The electrical insulation composition according to claim 1, wherein the styrene-based thermoplastic elastomer is selected from the group consisting of a styrene-butadiene-styrene block copolymer, a hydrogenated styrene-butadiene-styrene block copolymer, a styrene-isoprene-styrene copolymer, a hydrogenated styrene-isoprene-styrene copolymer, a hydrogenated styrene-butadiene rubber, a hydrogenated styrene-isoprene rubber, a styrene-ethylene-butylene-olefin crystal block copolymer, and mixtures thereof.

22. The power cable according to claim 10, wherein the styrene-based thermoplastic elastomer is selected from the group consisting of a styrene-butadiene-styrene block copolymer, a hydrogenated styrene-butadiene-styrene block copolymer, a styrene-isoprene-styrene copolymer, a hydrogenated styrene-isoprene-styrene copolymer, a hydrogenated styrene-butadiene rubber, a hydrogenated styrene-isoprene rubber, a styrene-ethylene-butylene-olefin crystal block copolymer, and mixtures thereof.

* * * * *